United States Patent [19]

Duffy

[11] Patent Number: 5,392,875

[45] Date of Patent: Feb. 28, 1995

[54] HYDRAULIC REACTION VARIABLE ASSIST POWER STEERING SYSTEM

[75] Inventor: James J. Duffy, Livonia, Mich.

[73] Assignee: Ford Motor Company, Dearborn, Mich.

[21] Appl. No.: 230,193

[22] Filed: Apr. 20, 1994

Related U.S. Application Data

[63] Continuation-in-part of Ser. No. 46,701, Apr. 16, 1993, abandoned, which is a continuation-in-part of Ser. No. 811,963, Dec. 23, 1991, abandoned.

[51] Int. Cl.⁶ .............................................. B62D 5/08
[52] U.S. Cl. ..................... 180/132; 91/375 A; 180/141; 180/142; 180/143; 180/149; 464/2; 464/27
[58] Field of Search ............... 180/132, 141, 142, 143, 180/149; 91/375 A; 464/2, 24, 27, 82

[56] References Cited

U.S. PATENT DOCUMENTS

| | | | |
|---|---|---|---|
| 3,877,540 | 4/1975 | Masuda et al. | |
| 4,434,866 | 3/1984 | Duffy | 180/143 |
| 4,561,521 | 12/1985 | Duffy | 180/142 |
| 4,570,735 | 2/1986 | Duffy | 180/142 |
| 4,570,736 | 2/1986 | Waldorf | 180/143 |
| 4,586,582 | 5/1986 | Duffy | 180/142 |
| 4,676,334 | 6/1987 | Nakamura et al. | 180/142 |
| 4,715,464 | 12/1987 | Nakamura et al. | 180/142 |
| 4,765,428 | 8/1988 | Kawakami et al. | 180/143 |
| 4,805,714 | 2/1989 | Nakamura et al. | 180/141 |
| 4,905,784 | 3/1990 | Yamashita | 180/143 |
| 4,913,250 | 4/1990 | Emori et al. | 180/79.1 |
| 4,957,468 | 9/1990 | Otsuka et al. | 464/27 |
| 5,016,723 | 5/1991 | Sano | 180/143 |
| 5,046,573 | 9/1991 | Jones | 180/143 |
| 5,046,574 | 9/1991 | Goodrich, Jr. et al. | 180/143 |
| 5,135,068 | 8/1992 | Emori et al. | 180/132 |
| 5,147,009 | 9/1992 | Chikuma et al. | 180/143 |

FOREIGN PATENT DOCUMENTS

0369311 5/1990 European Pat. Off. .
2719926 11/1978 Germany .

Primary Examiner—Mitchell J. Hill
Attorney, Agent, or Firm—Roger L. May; Raymond L. Coppiellie

[57] ABSTRACT

A power steering system for automobiles comprising a rotary, driver-operated valve which is adapted to control pressure distribution from a steering pump to power-assist fluid motors and to a set of transversely disposed fluid pressure reaction pistons and which responds to a reaction pressure to oppose steering valve motion whereby the relationship between pressure and torque developed by the steering system can be tailored to provide the optimum relationship between these variables so that a desired reduced steering torque is provided at low vehicle speeds and a greater steering torque is provided at high vehicle speeds.

7 Claims, 9 Drawing Sheets

FIG-8B

HYDRAULIC REACTION VARIABLE ASSIST POWER STEERING SYSTEM

REFERENCE TO RELATED DISCLOSURE

This application is a continuation-in-part of U.S. application Ser. No. 08/046,701, filed Apr. 16, 1993, now abandoned, which in turn is a continuation-in-part of U.S. application Ser. No. 07/811,963, filed Dec. 23, 1991, (now abandoned).

TECHNICAL FIELD

This invention relates to power steering systems for automotive vehicles wherein the steering effort required for steering maneuvers at low vehicle speeds is reduced and at high speeds is increased, thus providing an optimum steering pressure versus steering torque relationship.

BACKGROUND OF THE INVENTION

My invention comprises improvements in a power steering gear of the kind disclosed in U.S. Pat. Nos. 4,434,866, 4,586,582, 4,570,735, 4,561,521, and 4,570,736. Each of these patents is assigned to the assignee of my present invention. Each of the prior art constructions disclosed in these patents comprises a power steering system having a fluid motor with a double-acting piston which cooperates with a fluid cylinder of the motor to define two opposed working chambers. A power steering pump, driven by the vehicle engine, includes a pressure control valve and a flow control valve so that the flow delivered by the pump to the steering system remains constant regardless of varying engine speed.

The fluid circuit, of which the motor and the pump are a part, includes a rotary valve assembly having an inner valve member connected mechanically to a driver-controlled steering shaft and a rotary valve sleeve connected to the dirigible wheels of the vehicle. The valve assembly comprises registering valve lands that control pressure distribution from the pump to the motor whereby the angular disposition of the dirigible wheels of the vehicle is controlled with a steering effort that is assisted by the steering pressure forces developed by the motor.

The inner and outer valve elements define registering valve lands which cooperate, one with respect to the other, to define a variable area flow path between the outlet side of the pump and the flow return side. Provision is made for connecting each of the opposed working chambers of the fluid motor to the rotary valve assembly so that the pressure developed in the pressure passages connecting the pump with the motor may be distributed to each of the working chambers selectively. When one chamber is pressurized and the other exhausted, the vehicle is adapted to turn in one direction. Upon a reversal in the direction of the pressure differential in the fluid motor, the steering direction reverses.

Since the flow delivered by the pump is constant, the pressure differential developed in one working chamber is a function of the reciprocal of the square of the effective flow area across the valve lands. Thus, the relationship between pressure and valve flow area can be expressed by the equation:

$$\text{Pressure} = K\left(\frac{Q}{CA}\right)^2,$$

where C and K are constants and A is the effective flow area. Since the flow Q is also a constant, the pressure is functionally related only to the reciprocal of a single variable; namely, the effective flow area. Thus, $$\text{Pressure} = \frac{K'}{(CA)^2},$$

where K' is a different characteristic constant that takes into account the value of flow.

Torque is transferred from the steering shaft to the driving pinion of the steering gear through a torsion bar. Upon deflection of the bar, relative angular motion of the elements of the steering valve occurs. Thus, the steering torque is determined by the torsion bar deflection as is the steering assist provided by the fluid motor.

The relationship between torque applied to the torque input shaft and the steering pressure that is developed can be changed by a vehicle speed-sensitive valve in a parallel flow circuit from the pump through the valve system so that at low speeds the pressure is highly sensitive to changes in torque, whereas at high speeds the pressure changes are relatively insensitive to torque. These distinct functional relationships are identified in U.S. Pat. No. 4,561,521 as a low-speed operating mode and as a high-speed operating mode, respectively.

Other prior art references that describe a variable steering assist depending upon speed and employ pressure reaction pistons that resist relative angular displacement of the steering valve elements are French Patent 2,537,936 (1983) and U.S. Pat. No. 4,905,784, dated Mar. 6, 1990.

DISCLOSURE OF THE INVENTION

The improved steering system of the present invention includes a rotary spool-type steering valve with a floating inner spool valve element wherein reaction pistons are provided in the valve mechanism to establish a resistance to relative movement of the valve elements depending upon steering pressure. As the vehicle speed and the steering load increase, steering torque is increased. This increase in steering torque is determined by modulating steering pressure that acts on the reaction pistons and opposes the relative movement of the steering valve elements. Thus, instead of having two distinct operating modes as in the case of the structure of U.S. Pat. No. 4,561,521, which as mentioned earlier is identified as a low-speed mode and a high-speed mode, the system of the present invention makes it possible to shape the pressure-versus-torque relationship so that an optimum relationship can exist for all vehicle speeds and for all steering torque demands.

According to a first embodiment of the invention, the reaction pressure that acts on the reaction pistons can be determined by one or two hydraulic reaction pressure modulator valves and by a speed-sensitive proportional solenoid valve. The solenoid valve selects the appropriate relationship between pressure and torque for any vehicle speed, and the pressure modulator valves establish the appropriate shape of the pressure versus torque relationship that is selected by the speed-proportional solenoid valve.

Unlike the power steering system of prior art patent 4,905,784, the present invention comprises series-related modulator and speed proportional valves that modify the steering pressure with a minimum of fluid flow through the valves. In contrast, the steering system of prior art patent 4,905,784 has separate parallel flow paths through the valve system and a speed sensitive valve on the downstream side of the parallel flow paths, the latter discharging into the low pressure side of the pump. Such an arrangement would require a pump that is much larger than the pump of the present invention. If a larger pump were not used, the excess flow that occurs during parking and at low speeds would not be available to maintain increased power assist during parking and low-speed steering.

In a second embodiment of the invention, a pressure control solenoid shapes the pressure/torque boost curves by means of a programmed electronic processor using software that controls the functional relationship between the hydraulic reaction pressure and the steering pressure, thus eliminating the need for the hydraulic reaction pressure modulator valves.

BEST MODE FOR CARRYING OUT THE INVENTION

Figure 1:
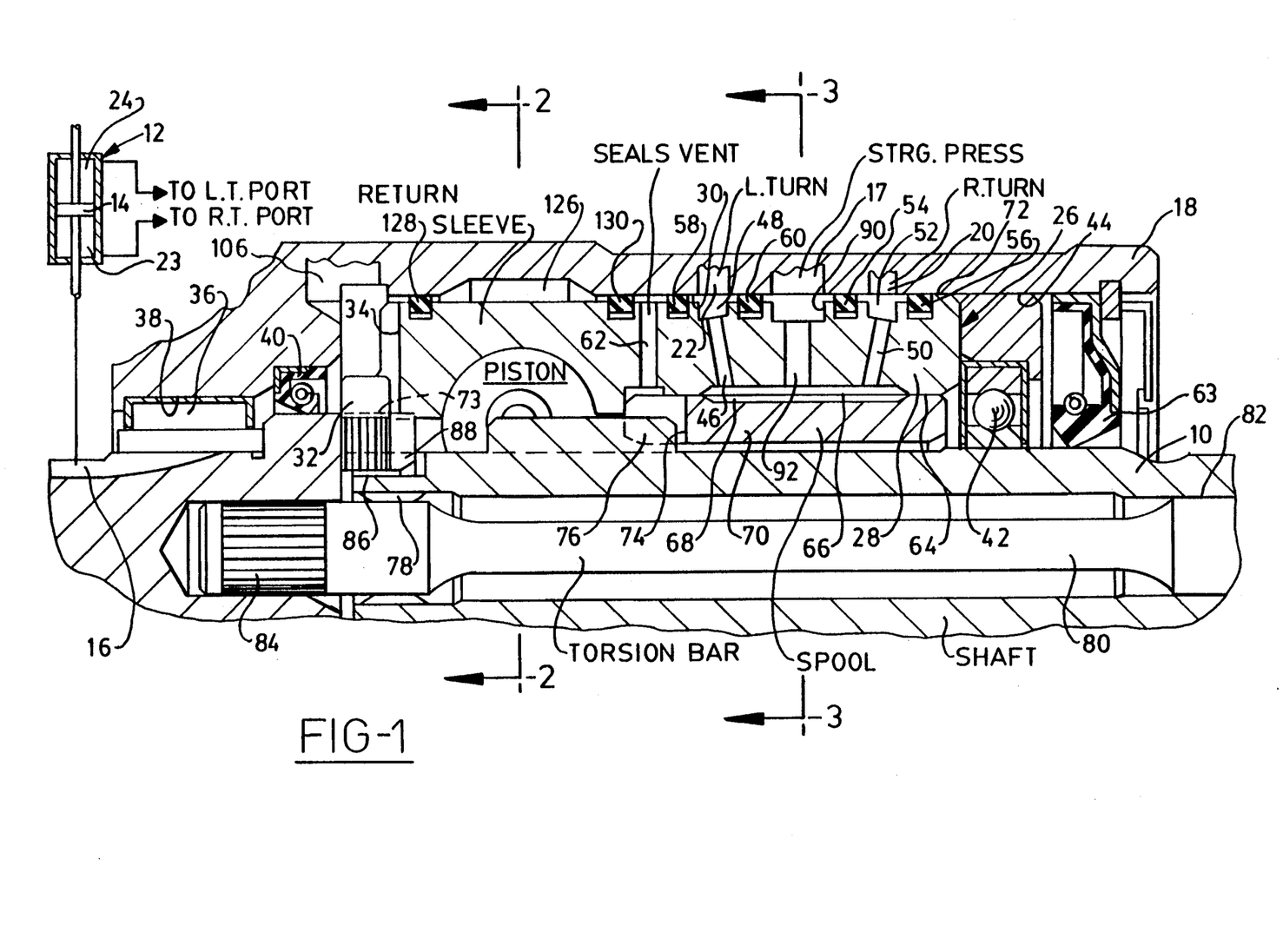
FIG. 1 shows a cross-sectional view of a rotary steering valve assembly of a power steering system of the kind discussed in the preceding discussion.

Numeral 10 in FIG. 1 designates a driver-controlled steering shaft for a motor vehicle. Numeral 12 generally designates, in schematic form, a fluid motor having a pressure-actuated piston 14 connected to the vehicle traction wheels through a suitable steering linkage (not shown) and to a pinion 16, which is adapted to be connected by means of a rack-and-pinion assembly to the piston 14. Steering pressure of the power steering pump is adapted to deliver working pressure to pressure input port 17. The pump and the associated fluid circuit will be described more fully with reference to FIG. 4.

The steering gear includes a cylindrical housing 18 in which steering pressure port 17 is formed. A right-turn port 20 and a left-turn port 22 also are formed in the housing 18. These are connected, respectively, to pressure chambers 23 and 24 for the fluid motor 12.

FIG. 1 shows a valve assembly identified generally by reference numeral 26. This valve assembly comprises a valve sleeve 28 situated in valve cylinder 30 formed in housing 18. A drive pin 32 carried by the pinion 16 extends radially with respect to the axis of the sleeve 28 and engages an end groove 34 in one end of the sleeve 28. Thus, during steering maneuvers, the sleeve 28 moves with the pinion 16 within the steering valve cylinder 30.

The pinion 16 is journalled by a bearing 36 in bearing opening 38 formed in the housing 18. A fluid seal 40 seals the pinion and the housing opening through which the pinion extends.

Steering shaft 10 is journalled by bearing 42 on the right-hand side of the sleeve 28 as shown in FIG. 1. Bearing 42 provides a bearing support as it is carried by the cylinder 30 of the housing 18, as shown at 44.

Left-turn passage 46 in the sleeve 28 communicates with annular groove 48, which in turn communicates with left-turn passage 22. Similarly, right-turn passage 50 communicates with an annular groove 52 in sleeve 28. Groove 52 in turn communicates with right-turn port 20. Seal rings are disposed in seal ring grooves situated on either side of the groove 52, as shown at 54 and 56. Similarly, seal ring grooves receive seal rings on either side of the left-turn port 22, as shown at 58 and 60. A vent port 62 in sleeve 28 communicates with a vent port 106 in the housing 18. This provides a venting of the interior of the valve cylinder 30 between the seal 40 and a corresponding lip seal 63.

The valve sleeve 28 has a central opening 64 in which is formed internal valve lands 66. These register with external valve lands 68 formed on a valve spool 70, the latter being piloted at each of its axial ends in the opening 64.

Valve sleeve 28 is piloted in the housing 18 as pilot surface 72 registers with the surface 44 of cylinder 30. The other end of the sleeve 28 is piloted at 73, as seen in FIG. 1 at the left-hand side of the sleeve 28.

The spool 70 is provided with angularly spaced slots 74 which register with radial projections 76 formed on the torque input shaft 10, the latter being piloted by bearing element 78 on the left end of torsion bar 80.

Torque input shaft 10 is drivably connected to the torsion bar 80 at 82. The left end of the torsion bar 80 is splined as shown at 84 to an internally splined opening in the end of the pinion 16.

The left end of the torque input shaft 10 is provided with dog coupling teeth in the form of angularly spaced slots 86 which register with corresponding internal coupling teeth 88 in the right end of the pinion 16, thus forming a lost motion connection between the shaft 10 and the pinion 16. The degree of relative motion established by the dog coupling will permit the torsion bar to transmit torque from the input shaft 10 to the pinion 16 up to a limit. When that limit is reached, torque is transferred directly from the shaft 10 to the pinion 16 through the dog coupling.

Any misalignment of the sleeve 28 with respect to the axis of the pinion 16 can be accommodated by reason of the articulation that is permitted by the end bearing supports at the right end of the sleeve as shown at 72 and the left end of the sleeve as shown at 73. Regardless of the angular disposition of the axis of the sleeve 28 with respect to the axis of the pinion 16, the spool 70 will precisely register with the sleeve 28 because of the articulated connection between the spool 70 and the input shaft 10 provided by the slots 74 and the projections 76. The spool thus can be considered to be a floating valve spool which always registers precisely with the internal valve lands of the sleeve 28 regardless of any slight misalignment of the shaft 10 and sleeve 28 with respect to pinion 16.

Figure 3:
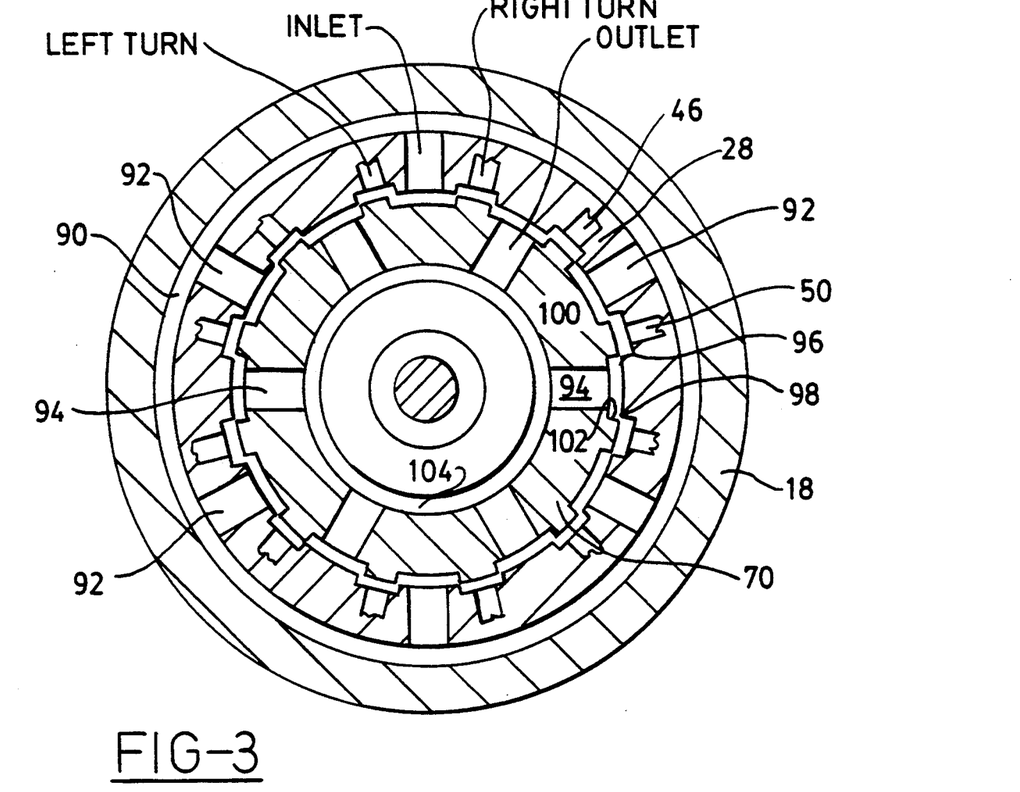
FIG. 3 is a cross-sectional view taken along the plane of section line 3—3 of FIG. 1 showing the inner and outer valve lands of the steering valve elements.

As seen in FIG. 1, pressure input port 17 communicates with a groove 90 in the sleeve 28. This, in turn, communicates with radial ports 92. Valve spool 70 is provided with radial ports 94, as seen in FIG. 3, which are situated between internal valve lands 96 and 98 formed in the valve sleeve. External valve lands 100 and 102 formed in the spool 70 register, respectively, with internal lands 96 and 98, thus forming a flow passage on either side of the radial ports 94.

The radially inward ends of the ports 94 communicate with annular space 104 which is a flow return passage that communicates with return flow passage 106 seen in FIG. 1.

When the valve spool is centered with respect to the sleeve, the flow area established by the registering valve lands for the right-turn port 50 is substantially the same as the flow area for the left-turn ports 46. Thus, the pressure differential across the steering motor piston 14 is zero and the pressure forces are balanced. Fluid flow delivered through the passages 92 is distributed in this case across the valve lands and through the radial ports 94 to the flow return passage.

If steering torque is applied in a right-turn direction to the torsion bar, the valve spool will shift slightly in a clockwise direction relative to the valve sleeve seen in FIG. 3, thereby enlarging the flow area between passages 92 and ports 50 and simultaneously decreasing the flow area between passages 92 and the ports 46 leading to the right-turn side of the fluid motor. This provides a steering assist which complements the steering torque applied to the pinion through the torsion bar.

It should be noted in FIG. 3 that in a left turn, as the external lands controlling the flow to the passages 50 increases the degree of communication between passages 92 and ports 46, the corresponding degree of communication between port 50 and radial passage 94 is decreased. The converse is true when the direction of the steering torque is reversed. This change in flow area results in a pressure differential in accordance with the pressure function described in the description of the "Background of the Invention" set forth above.

According to a principal feature of my invention, I have provided a means for resisting the angular motion of the spool relative to the sleeve, and I have provided a means for varying the amount of that resistance depending upon the speed of the vehicle. This is achieved by the hydraulic reaction pistons shown in FIG. 2.

Figure 2:
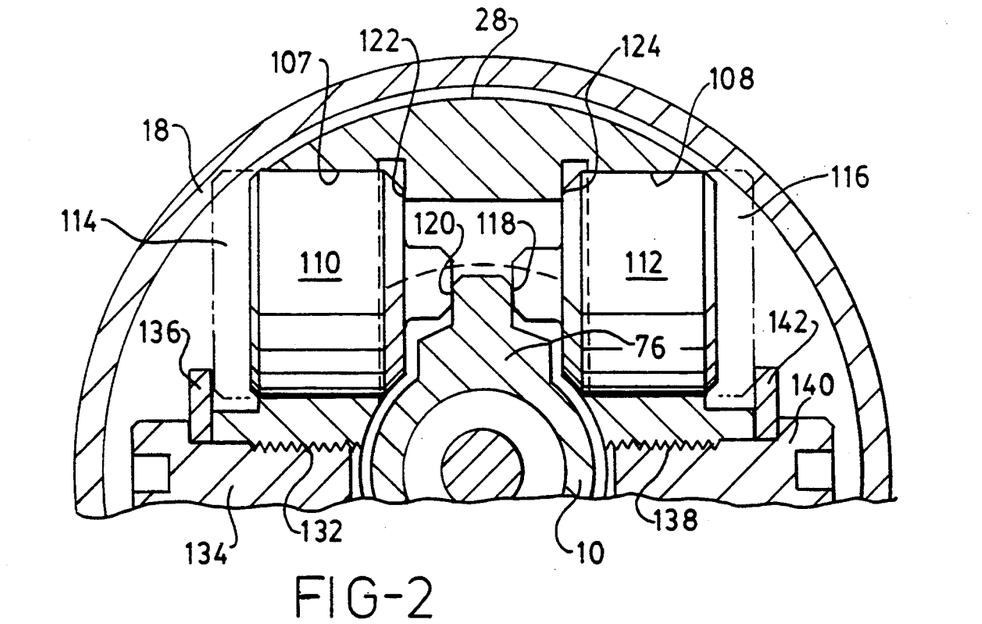
FIG. 2 is a view as seen from the plane of section line 2—2 of FIG. 1 showing the reaction pistons that resist relative movement of the steering valve elements.

As seen in FIG. 2, the sleeve is provided with a pair of opposed reaction pressure cylinders 107 and 108. A reaction piston 110 is slidably disposed in cylinder 107, and a corresponding piston 112 is slidably disposed in reaction cylinder 108. Piston 110 and cylinder 107 define a reaction pressure working chamber portion 114, which communicates with a reaction pressure port (not shown) formed in the housing 18. Similarly, piston 112 and cylinder 108 define a reaction pressure working chamber portion 116, which communicates with the same reaction pressure port formed in the housing 18.

Each projection 76 on the steering shaft 10 includes a reaction surface 118 which is engaged by the piston 112 and a reaction surface 120 which is engaged by the piston 110. When the working chamber 116 is pressurized, a reaction pressure force developed on the piston 112 causes a counterclockwise torque to be applied to the shaft 10. Similarly, if the pressure chamber 114 is pressurized, piston 110 will apply a clockwise torque to the shaft 10 as viewed in FIG. 2.

When the shaft 10 is centered with respect to the sleeve, piston 110 engages a stop shoulder 122 formed in the sleeve 28, and piston 112 engages a stop shoulder 124 also formed in the sleeve 28. During straight-ahead driving, when the steering pressures on either side of the piston 14 of the fluid motor are balanced, the reaction pressures in chambers 114 and 116 are balanced and the pistons 110 and 112 assume the positions shown in FIG. 2.

If the spool is displaced relative to the sleeve, one of the pistons 110 or 112 is displaced from its stop 122 or 124 and the pressure in the working pressure chamber portions 114 and 116 resists relative angular displacement of the shaft with respect to the sleeve.

It is apparent from the foregoing description that the magnitude of steering torque that is achieved is dependent in part upon the pressure established in the chamber portions 114 and 116. I have made provision for controlling that pressure so that the relationship between steering torque and steering pressure can be modified or tailored to suit any particular driving condition. For example, at high speeds, the resistance to relative angular displacement of the steering shaft relative to the sleeve is increased.

In a typical variable assist power steering mechanism of the kind shown in U.S. Pat. No. 4,570,735, at low speed the steering pressure differential increases at a high rate as steering torque increases. At high vehicle speeds, the steering pressure increases at a lower rate for a given steering torque increase. The improved steering gear mechanism of my present invention makes it possible to tailor the characteristic curves so that any one of a family of curves between the maximum and minimum values can be achieved as the vehicle speed changes. Other vehicle characteristics, measured by other operating variables such as engine throttle position, vehicle lateral acceleration and road surface slope can be used to modify the relationship of torque to steering pressure differential. This control of the reaction pressure may be achieved electronically, as will be described with reference to FIGS. 4, 4A, 4B, 4C, 10A and 10B.

The pressure chamber portions 114 and 116 communicate with an annular space 126, as seen in FIG. 1, which surrounds the sleeve. Space 126 and the working chamber portions 114 and 116 form a part of the space 126 and have a common reaction pressure. Space 126 is sealed from the adjacent fluid passages by a pair of axially spaced seal rings 128 and 130.

The sleeve 28, as seen in FIG. 2, is provided with a threaded opening 132 which receives a bolt 134 which retains a stop washer 136 located in the path of movement of piston 110. Thus, the stop washer 136 limits the left-hand movement of the piston 110 as viewed in FIG. 2. Similarly, a threaded opening 138 is formed in the opposite side of the opening 132. This opening receives a bolt 140 which retains another stop washer 142 which limits the movement of the piston 112 in a right-hand direction.

Figure 7:
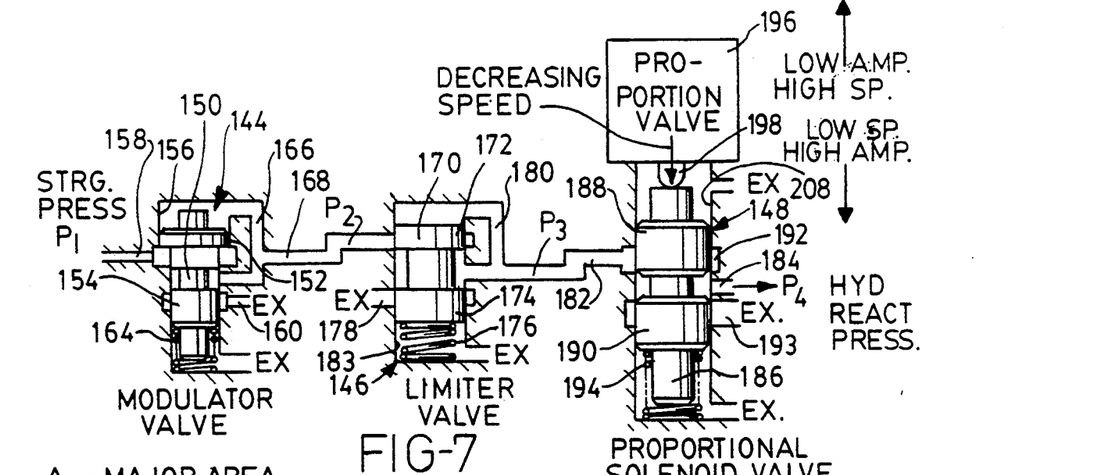
FIG. 7 is a schematic valve diagram showing a modulator valve, a pressure limiter valve, and a proportional solenoid valve for a first embodiment of the invention.

Shown in FIG. 7 is a hydraulic reaction pressure control system that comprises three main elements; namely, a modulator valve 144, a pressure limiter valve 146 and a proportional solenoid valve 148. Modulator valve 144 comprises a valve spool 150 having spaced valve lands 152 and 154, which respectively register with valve ports formed in valve chamber 156. These ports communicate with a steering pressure inlet port 158 and a return port 160. Feedback pressure passage 166 distributes modulated steering pressure to the upper side of land 152 to provide a pressure force that opposes the force of valve spring 164. Similarly, feedback passage 168 communicates with the lower side of land 152 to establish a pressure force that assists the force of spring 164. A pressure $P_2$ will be developed by the modulator valve in outlet passage 168 that is functionally related to steering pressure in passage 158 and to the calibration of the valve lands and the valve spring.

The output pressure in passage 168 is delivered to the pressure limiter valve 146, which comprises valve spool 170 having spaced lands 172 and 174 and a valve spring 176. Return port 178 registers with land 174. A pressure inlet port, which forms a part of passage 168, registers with land 172. Feedback pressure passage 180 extends from the output side of the pressure limiter valve to the upper end of the land 172. Valve 146 thus establishes a limiting pressure $P_3$ in outlet passage 182, which communicates with valve chamber 183 intermediate the lands 172 and 174.

The hydraulic reaction pressure that is distributed to space 126 and to the pressure chamber portions 114 and 116 behind the pistons 110 and 112 is developed by the proportional solenoid valve 148. Output pressure port 184 for the hydraulic reaction pressure $P_4$ communicates with annular space 126 surrounding the valve sleeve 128 through a port (not shown) in the housing 18 seen in FIG. 1.

The proportional solenoid valve comprises a valve spool 186 having spaced lands 188 and 190 situated on opposite sides of the hydraulic reaction pressure outlet port 184. Land 188 registers with port 192 which communicates with limiter valve outlet pressure passage 182 and land 190 registers with return port 193. Valve spring 194 urges valve element 186 in an upward direction, thereby tending to open the return port and reducing the pressure $P_4$ in hydraulic reaction pressure port 184. Spring 194 also tends to open communication between outlet port 184 and the pressure limiter pressure passage 182.

A solenoid having an output force that is proportional to vehicle speed is identified generally by reference numeral 196. It includes a solenoid winding surrounding a solenoid armature 198 which engages valve spool 186 and establishes a solenoid force on the valve spool 186 that opposes the force of the spring 194. Decreases in vehicle speed will increase the force that opposes the force of the spring 194.

Thus, the series related valves regulate and then reregulate the steering pressure in passage 158 to produce a hydraulic reaction pressure in passage 184. The degree to which the steering pressure is modified depends upon the calibration of the valves and the valve springs so that the so-called shape of the boost curve representing steering torque versus steering pressure differential at various vehicle speeds have the optimum shape. If desired, two or more modulator valves may be used in series as will be explained subsequently.

Figures 8, 9:
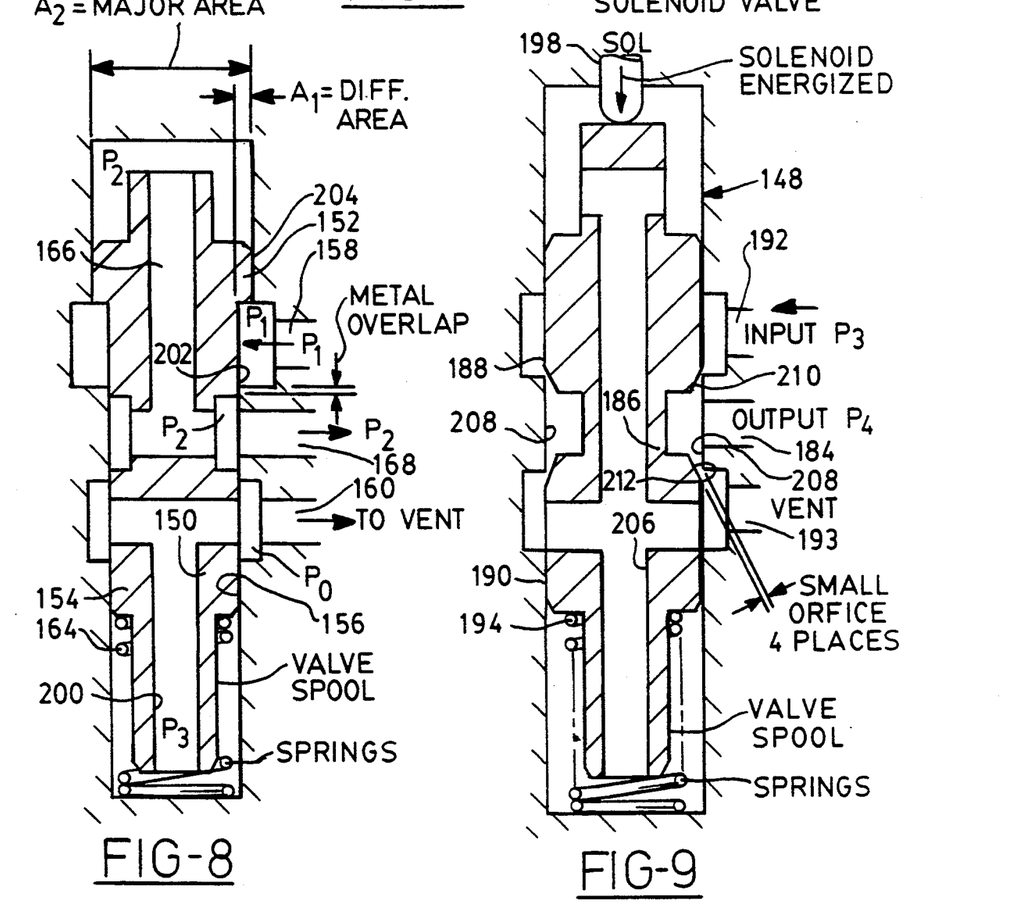
FIG. 8 is a detailed view of the pressure modulator valve of FIG. 7.
FIG. 9 is a detailed view of the proportional solenoid valve of the valve diagram of FIG. 7.
Figure 8A:
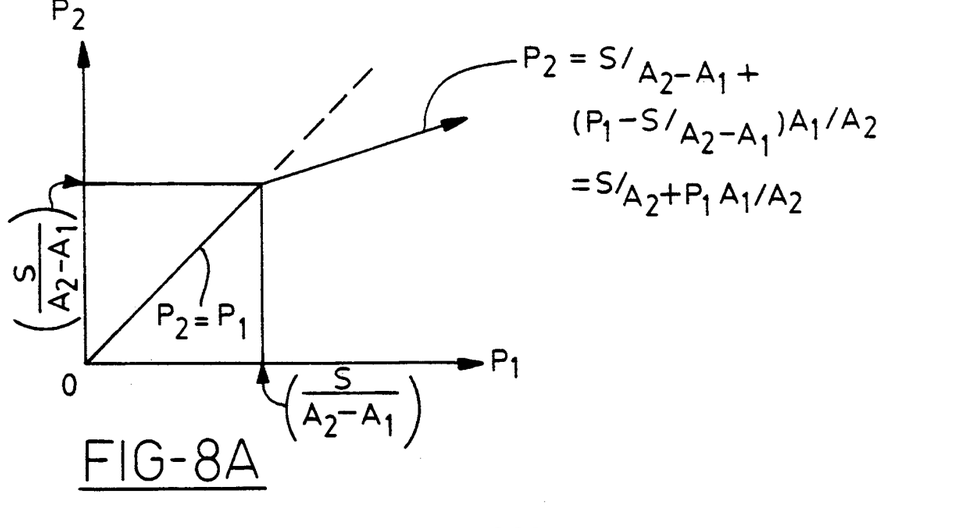
FIG. 8A is a graph showing the relationship between input pressure and output pressure for the pressure modulator valve of FIG. 8.
Figure 8B:
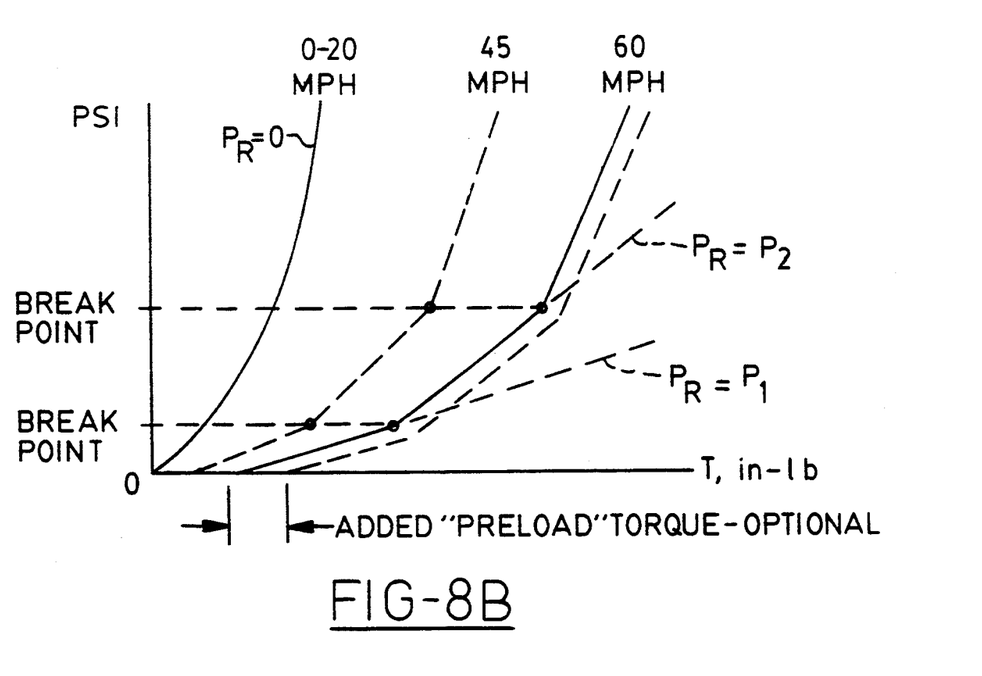
FIG. 8B is a graph showing the boost curves formed by the first embodiment using two modulator valves and a proportional solenoid valve.

The characteristic curve for the pressure boost function may be as shown in FIG. 8B where the pressure differential across the steering motor is shown plotted against steering torque for various vehicle speeds. At low vehicle speed, the pressure curve rises quickly as the torque increases. The curves progressively become flatter and have a lower slope as the vehicle speed increases.

FIG. 8 shows a preferred embodiment of the modulator valve illustrated schematically in FIG. 7. As seen in FIG. 8, feedback passage 166 is situated at the center of the valve spool 150 and communicates with outlet port 168. Return port 160 communicates with central opening 200 in the valve spool 150. Port 160 communicates with the lower end of the valve chamber 156 occupied by spring 164.

The symbols $P_1$, $P_2$ and $P_0$ in FIG. 8 represent the input pressure, the output pressure and the return pressure, respectively. As seen in FIG. 8, valve land 152 is formed with a double diameter, the smaller diameter portion 202 registering with inlet pressure port 158. A small degree of overlap at the metering edges of the valve land surfaces is provided as indicated by the label in FIG. 8. The calibration of the pressure modulator valve in FIG. 8 can be tailored by appropriately varying the diameter of the large diameter portion 204 of the land 152 relative to the diameter of land 154 and by appropriately varying the spring force of spring 164.

As in the case of the valve lands that control communication between ports 158 and 168, valve land 154 is provided with a small metal overlap at the location where the land 154 registers with the internal land for outlet port 168.

FIG. 8A shows a typical characteristic curve for the relationship between control pressure $P_2$ and the inlet pressure $P_1$. At pressures at the inlet port 158 that are insufficient to cause deflection of the preloaded spring 164, pressure $P_1$ will equal pressure $P_2$ as indicated by the plot of FIG. 8A. When the pressure force at the upper side of the land 152 increases sufficiently to cause the spring to deflect, the slope of the pressure line shown in FIG. 8A is modified so that it has a lesser slope. Thus, greater changes in the value of $P_1$ are required to effect a given change in the value of $P_2$. The relationship between the spring force, the areas and the pressures are indicated by the formula for $P_2$ set forth in FIG. 8B.

FIG. 8B shows how the modulator valve shapes pressure-torque boost curves at various vehicle speeds. Initially, the boost curves essentially have linear slopes which increase to new chosen values at chosen breakpoint steering pressures. Optionally, a second modulator valve may be added in series with the modulator valve of FIGS. 7 and 8. The second modulator valve would modulate the output pressure of the first modulator valve. The second modulator valve would be calibrated to produce a second breakpoint, as seen in FIG. 8B.

A preferred embodiment of the proportional solenoid valve of FIG. 8 is indicated in FIG. 9. As seen in FIG. 9, the return port communicates through a central passage 206 with each of the ends of the valve spool 186. The output port 184, which carries reaction pressure outlet pressure $P_4$, communicates with the valve chamber 208 at a location between the lands 188 and 190. Land 188 registers with input passage 192 through a tapered metering edge 210 formed on the land 188. Similarly, a metering edge 212 formed on the land 190 provides controlled communication between reaction pressure outlet port 184 and vent or return port 193. Thus, the shape of the characteristic curves representing the relationship between reaction pressure and input pressure $P_3$ can be modified by calibrating the flow restriction established by the tapered edges of the valve lands as shown at 210 and 212.

If desired, the valve land tapered edges can be provided with a series of grooves defining small orifices, as indicated by the legend shown in FIG. 9. For any given change in the solenoid force established by the solenoid 196, the resulting variation in the output pressure $P_4$ can be modified, thus avoiding abrupt changes in output pressure for a given change in the solenoid force.

When the solenoid is fully energized, pressure $P_4$ equals return pressure. When the solenoid is de-energized, valve spool 186 is shifted up so that pressure $P_4$ equals pressure $P_3$. When the solenoid is partially energized, the outlet pressure $P_4$ is equal to the inlet pressure $P_3$ times a constant that depends upon the calibration of the valve 148.

When the solenoid is partially energized, $P_4 = K$ times $P_3$, where K is a constant that depends in part upon the relative values at the chamfers that form the small orifices indicated in FIG. 9.

Figure 4:
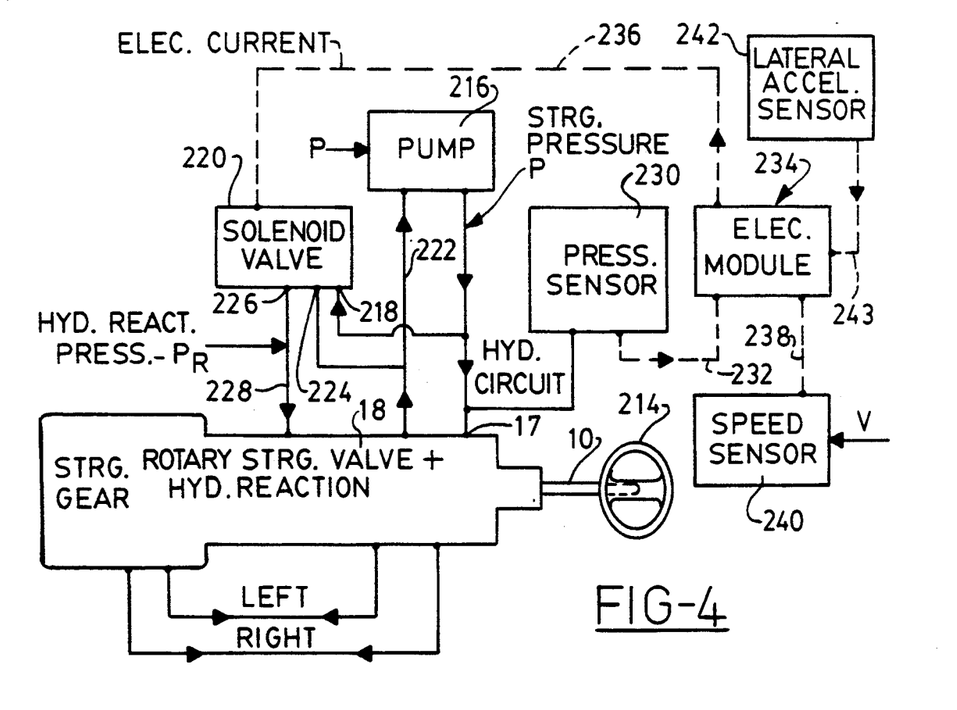
FIG. 4 is a schematic diagram of the overall system of a second embodiment of the invention.

In a second embodiment of my invention, as shown in FIG. 4 in schematic form, an electronically controlled steering system for developing a reaction pressure for the reaction pistons includes an electronic microprocessor. The magnitude of the reaction pressure is dependent upon the output signal developed by the microprocessor and the resulting solenoid driver signal for the solenoid valve. The system senses the output load, which is the steering pressure differential at the steering motor, and the vehicle speed to control the steering effort in accordance with the calibration of the electronic module for the microprocessor and the software program by means of which the electronic control unit of the microprocessor responds to the vehicle operating parameters.

In addition to vehicle speed, the software may cause instructions to be issued to the electronic control unit to develop a modification for the reaction pressure depending upon lateral acceleration, for example, or possibly other variables such as steering wheel angle, road grade, road crown and slope. Such lateral acceleration becomes of importance during turning maneuvers of the vehicle and when the vehicle is subjected to transverse forces such as wind gusts as the vehicle is travelling in a straight-ahead direction.

The electronic microprocessor makes it possible, therefore, for the steering system to control the steering effort by increasing the hydraulic reaction forces developed by the reaction pistons rather than by controlling the effort due to changes in the torsion bar twist, as in the case of the steering systems shown in prior art patents of the type previously described such as U.S. Pat. Nos. 4,570,735 and 4,570,736. It is possible also to achieve that degree of control while reducing to a minimum the angular displacement of the inner valve member relative to the internal lands formed on the valve sleeve. Thus, valve friction is reduced and the hydraulic circuit for the valve elements is substantially simplified.

In FIG. 4, steering torque is applied to the torsion bar from steering wheel 214 and the torque input shaft 10. Steering pressure is developed by the pump 216 and is delivered to inlet port 218 of the solenoid valve 220. Valve 220 is illustrated in schematic form in more detail in FIG. 10.

A flow return passage 222 returns the steering fluid to the pump from exhaust port 224 in the solenoid valve. Hydraulic reaction pressure is distributed from port 226 in the solenoid valve 220 to passage 228, which communicates with the pressure chambers of the reaction pistons and with the space 126 shown in FIG. 1.

The magnitude of the steering pressure is sensed by a pressure sensor 230, which may be any of a number of well known pressure sensors capable of developing a pressure signal that is proportional to the input pressure in port 17 of the steering gear. This achieves a closed-loop control circuit wherein the processor may adjust reaction pressure in accordance with pressure changes detected by the sensor 230. The sensor 230 acts as a pressure-to-voltage transducer and distributes a signal voltage through line 232 to a microprocessor 234. Microprocessor 234 develops a signal in line 236, which is distributed to the solenoid valve 220, as indicated in the schematic diagram of FIG. 4.

In addition to the electrical signal provided for the microprocessor 234 through line 232, the input signal conditioning circuit for the microprocessor 234 receives a vehicle speed signal through line 238 from speed sensor 240. If desired, other input signals can be distributed to the microprocessor 234 such as the signal developed by a lateral acceleration sensor 242, that signal input being shown at 243.

Figure 4A:
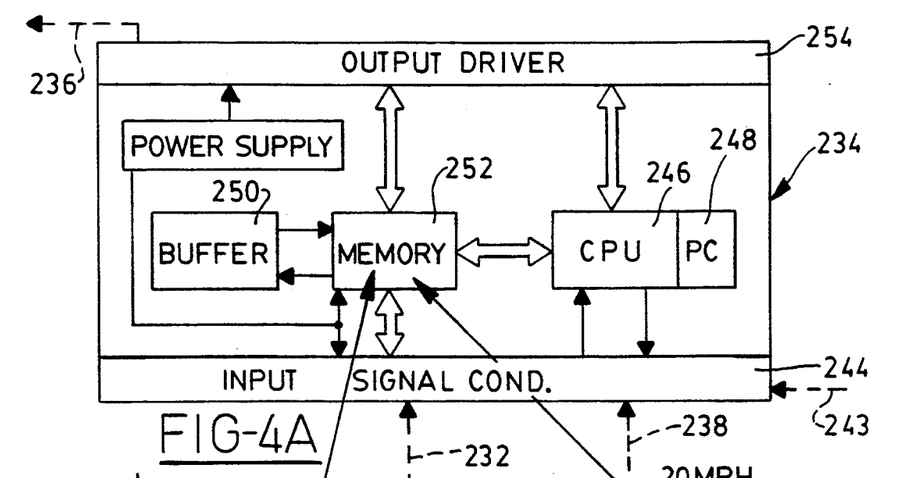
FIGS. 4A, 4B and 4C show a schematic representation of an electronic microprocessor for use in the system of FIG. 4.
Figure 4B:
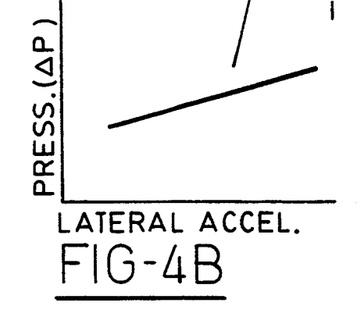
Figure 4C:
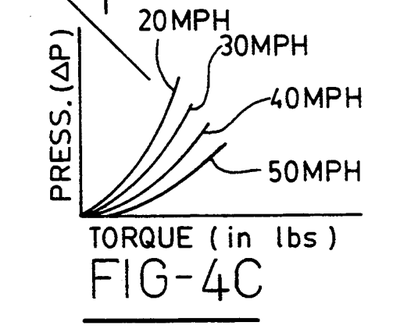

As seen in FIGS. 4A, 4B and 4C, the microprocessor 234 includes an input signal conditioning circuit 244 which receives the input signals, such as the speed sensor signal and the lateral acceleration sensor signal. The microprocessor 234 further includes a central processor unit or "CPU" 246 which is under the control of a program counter 248. In known fashion, the CPU will fetch a signal from the input signal conditioning portion 244 and transfer it to a buffer storage area such as the buffer 250. It then addresses the memory portion 252 to obtain data stored in memory for comparison to the input signal value stored in the buffer. The result of that comparison is a computation that results in the transfer of an output signal to the output driver portion of the processor as shown in 254. The data that is stored in memory is the optimum functional relationship between steering pressure and torque, as indicated schematically in FIGS. 4A, 4B and 4C. Various values for steering torque for each value of steering pressure is stored in memory and for each of the family of vehicle speeds. That data represents the optimum steering torque for the particular driving conditions that are sensed by the sensors, including the sensor 240 and the sensor 242.

The lateral acceleration sensor 242 develops a signal that is delivered also to the input signal conditioning portion 244 where it is fetched and compared to a memory value such as that illustrated schematically in FIGS. 4A, 4B and 4C. The schematic illustrations in FIGS. 4A, 4B and 4C show a plot of the relationship between steering pressure and lateral acceleration.

The value of steering torque can be modified by the microprocessor 234 without a corresponding deflection of the torsion rod in order to accommodate varying operating conditions as measured by the various sensors, such as the speed sensor 240 and the lateral acceleration sensor 242.

Figure 5:
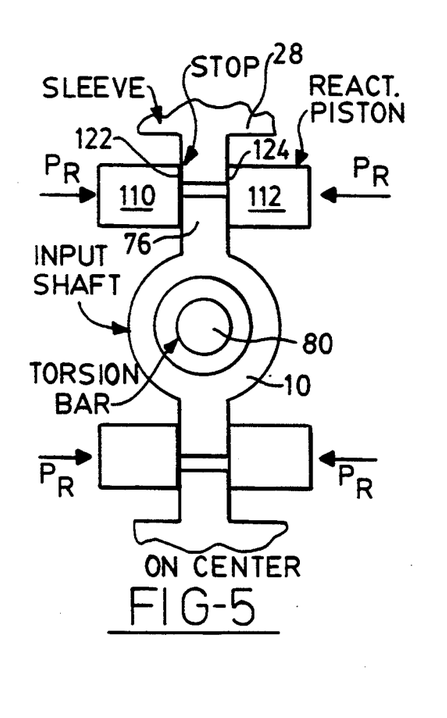
FIG. 5 is a schematic representation of a steering valve and, in particular, the relationship between the reaction pistons and the torque input shaft for the rotary valve assembly. The reaction pistons are shown in the position they assume when the valve elements are in the on-center position.
Figure 6:
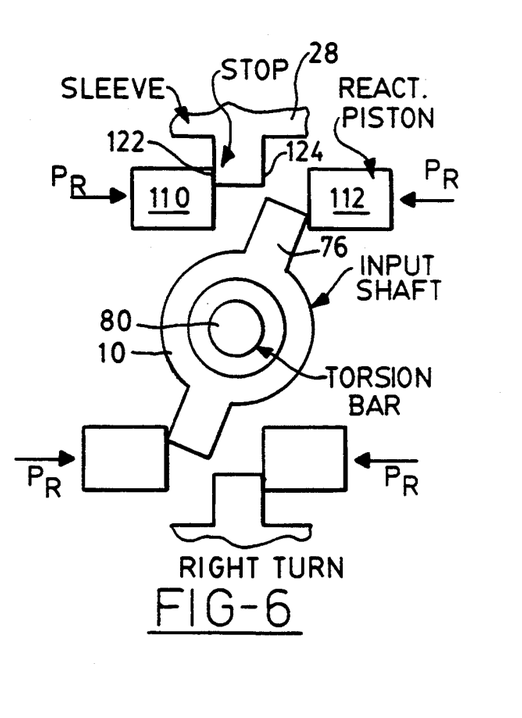
FIG. 6 is a view similar to FIG. 5, although it shows reaction pistons in a right-turn mode.

FIG. 5 shows in schematic form the relationship between the input shaft and the reaction pistons 110 and 112 when the steering gear is in the so-called on-center position, At that time, the pistons 110 and 112 engage their respective stops 122 and 124. FIG. 6 shows the same elements indicated in FIG. 5, but the input shaft has been turned upon application of torque to the steering wheel so that piston 124 is displaced as is the corresponding piston on the opposite side of the input shaft axis. The pressure force acting on the piston 112 by the reaction pressure opposes the relative displacement of the shaft 10 relative to the sleeve 28.

It should be noted that a "preload" reaction pressure will prevent any valve motion until it is overcome by a "preload" steering torque (see FIG. 8B). The desired values may be selected by adjusting the pressure drop across the rotary valve.

Figure 10:
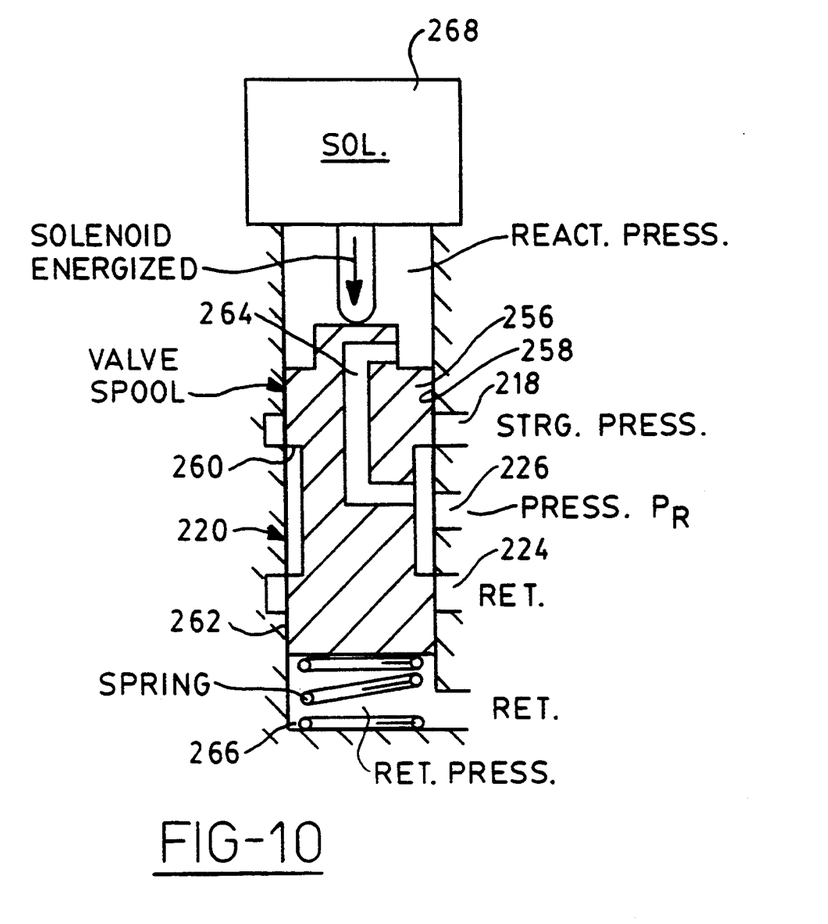
FIG. 10 is a view of a pressure control solenoid valve for the embodiment of my invention shown in FIG. 4.

FIG. 10 shows in schematic form in more detail the solenoid valve 220 illustrated schematically in the system of FIG. 4. Steering pressure is delivered to the solenoid valve 220 through steering pressure passage 218. The solenoid valve comprises a valve spool 256 slidably disposed in valve chamber 258. Valve land 260 formed on the valve spool 258 registers with steering pressure port 218. Reaction pressure is distributed to the chamber 258 a location between land 260 and a second land 262, the latter registering with fluid return port 224.

Reaction pressure is distributed to the upper side of the land 260 through an internal passage 264. This creates a pressure force on the valve spool 256 which is opposed by valve spring 266. Return pressure acts on the lower side of the land 262. When the vehicle speed is high, the speed signal delivered to solenoid 268 is zero. When the vehicle speed is zero, the signal delivered to the solenoid 268 is a maximum. In a preferred embodiment, the maximum value is one ampere.

Thus, when the vehicle speed is high, the degree of communication between the reaction pressure passage 226 and the steering pressure passage 218 is increased and the communication between passage 226 and passage 224 is decreased. This results in a higher reaction pressure in passage 226. The converse is true when the vehicle speed decreases.

Figures 10A, 10B:
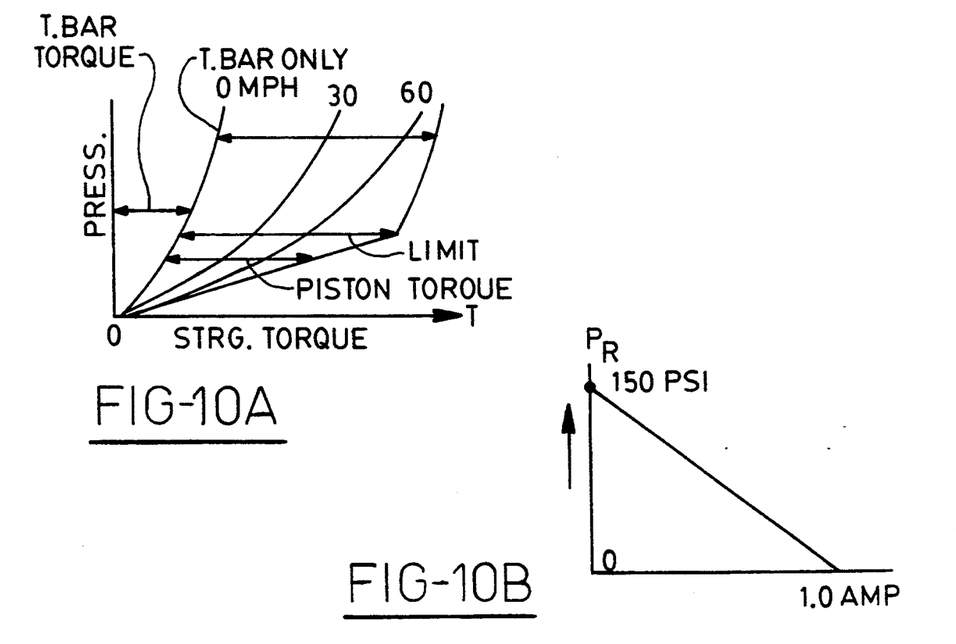
FIG. 10A is a graph that shows the pressure and torque relationships that are shaped with steering pressure and vehicle speed sensor software for the solenoid valve of the embodiment of FIG. 4 of my invention.
FIG. 10B shows the relationship between reaction pressure developed by the solenoid valve of FIG. 10 and amperage for the valve of FIG. 10.

FIG. 10A shows the relationship between steering torque and steering pressure when the pressure torque curves are shaped using steering pressure and vehicle speed as variables in the alternate embodiment of FIGS. 4, 4A, 4B and 4C. Thus, the steering torque will vary until a desired torque is achieved at a given vehicle steering pressure and speed. When the steering torque is determined by the additional variable made available by the pressure sensor, the curves are shaped so that the steering torque varies uniformly along a generally parabolic line for various vehicle speeds, thereby providing improved road feel. The steering sensation is determined by the actual vehicle steering requirements under a variety of steering conditions rather than the steering requirements determined only by vehicle speed.

If the pressure sensor were not employed in the system of FIGS. 4–4C, the characteristic curves would extend with a generally linear function to breakpoint values in a manner similar to the relationship shown in FIG. 8B.

In FIG. 10A, the total steering torque equals the torsion bar torque plus the reaction piston torque. The reaction piston torque equals the area of the reaction pistons times some calibration constant that takes into account the piston radius.

FIG. 10B shows the relationship between amperage for the solenoid and the reaction pressure. It should be noted that the relationship is generally linear and that it has a negative slope so that the maximum amperage corresponds to a minimum reaction pressure.

Figure 11:
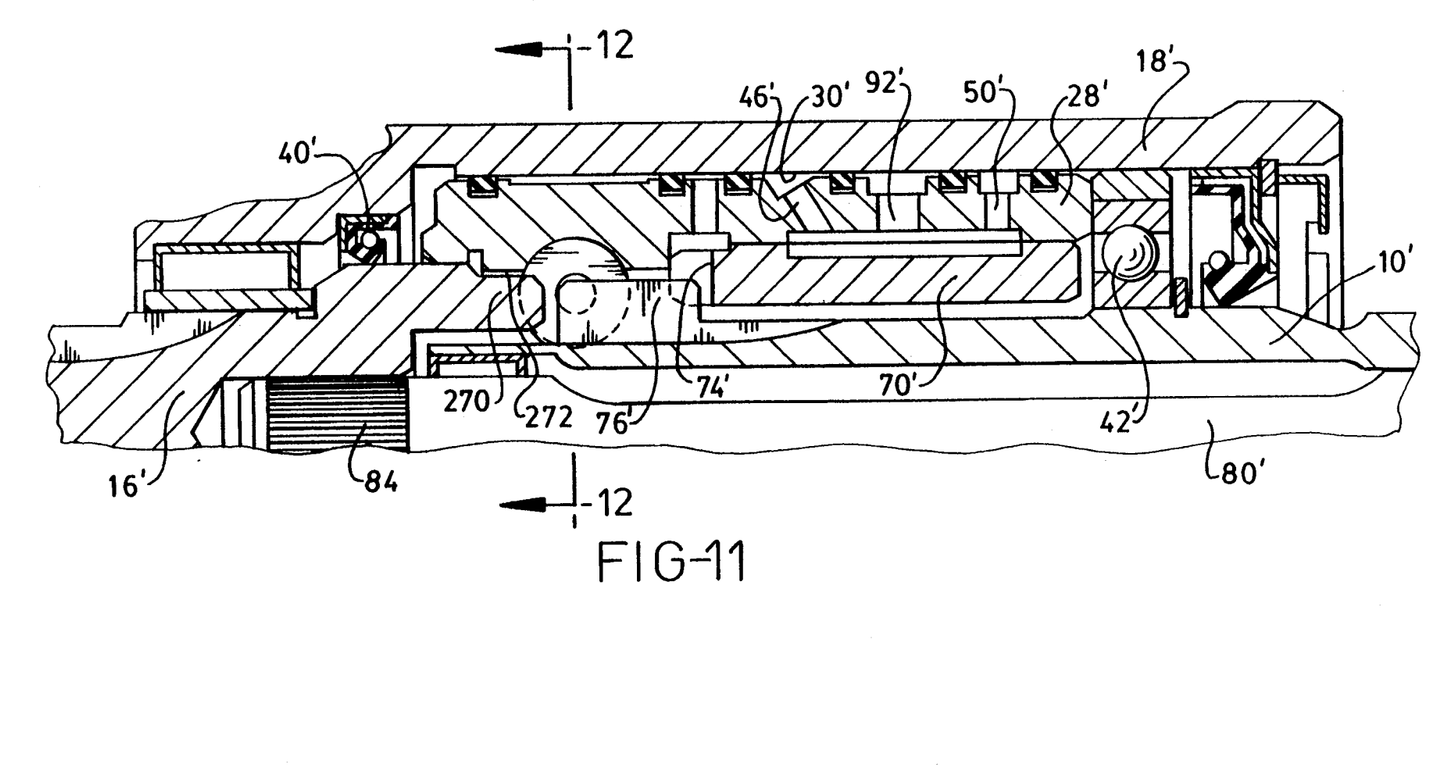
FIG. 11 shows a longitudinal cross-sectional view of a modified steering gear having pinion drive tangs that function as piston stops.
Figure 12:
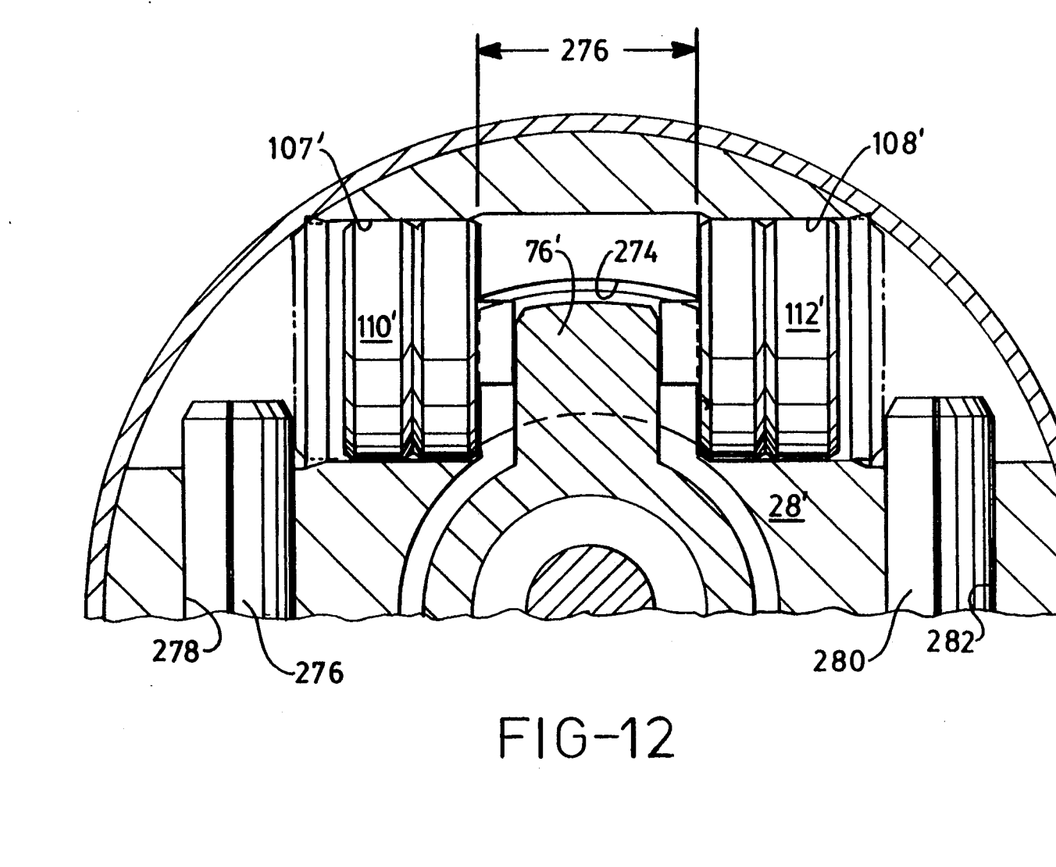
FIG. 12 shows a cross-sectional view of the steering gear of FIG. 11 as seen from the plane of section line 12—12 of FIG. 11.

In FIGS. 11 and 12, I have shown an alternate steering gear design that has a modified connection between the pinion and the sleeve. It does not include a drive pin and slot connection of the kind shown at 32 and 34 of the design shown in FIG. 1. Rather, the pinion 16 includes a pair of drive tangs 270 which extend within a broached opening 272 formed in the sleeve 28.

As best seen in the cross-sectional view of FIG. 12, the piston chambers shown at 108' and 106' are machined by drilling in a direction transverse to the axis of the steering gear. The sleeve 28', as best seen in FIG. 12, is formed with a broached axially extending opening 274. The width of the opening being indicated in FIG. 12 by dimensional line 276.

Radial projection 76' carried by the steering input shaft 10' is received within the broached opening 274. The tangs 270 straddle the radial projection 76' and are received in the broached opening 274. The width of the tangs is equal to the width of the broached opening indicated by dimensional line 276.

When a torque is applied to the input shaft, torque will be distributed in the usual way through the torsion bar 80 to the pinion 16' through the spline connection 84' described with reference to FIG. 1. The sleeve will follow the motion of the pinion 16' because of the mechanical coupling established by the pinion tangs and the broached opening through the left side of the sleeve 28' as seen in FIG. 11.

As the torsion bar deflects, relative displacement will occur between the spool 70' and the sleeve 28'. This is due to the driving connection between the projection 76' and the slot 74' in the end of the spool 70'. This will be accompanied by a displacement of the projection 76' relative to the sleeve, thereby displacing either one of the reaction pistons or the other depending upon the direction of the steering torque. That relative displacement is resisted in the manner previously described with reference to FIG. 1. The magnitude of resistance is dependent of course, on the magnitude of the reaction pressure acting on the reaction pistons 110' and 112'. Thus, the pinion tangs can serve two purposes. They can serve to establish a driving connection between the sleeve and the pinion, and they provide also an inner stop for the reaction pistons. In contrast to this arrangement, the inner stop in the embodiment of FIGS. 1 and 2 is formed on the cylinder itself as indicated at 122 and 124 of FIG. 2. The arrangement of FIG. 12 thus simplifies the machining operation in the manufacture of the steering gear. It also simplifies assembly procedure. It also makes it possible to reduce the valve housing size thereby making it easier to package the steering gear in the vehicle.

In the embodiment of FIG. 11, the elements of the steering gear mechanism that have counterpart elements in the embodiment of FIGS. 1 and 2 have been designated by similar reference characters, although prime notations are added to FIGS. 11 and 12.

Shown in FIG. 12 is a roll pin 276, which is press-fitted in opening 278 formed in the sleeve 28. It extends into the drilled opening that defines the cylinder 107'. Similarly, a pin, preferably a roll pin 280, is received by a force fit in opening 282 formed in the sleeve 28'. The pins 276 and 280 prevent shifting movement of the pistons 110' and 112' out of their positions in their respective cylindrical openings when reaction pressure is not present. This pin arrangement simplifies the design by eliminating the necessity for bolts 134 and 140 in the FIG. 2 embodiment. It also eliminates the need for the thrust bearings 136 and 142 in the FIG. 2 embodiment.

The embodiment of FIGS. 11 and 12 makes it possible to have manual steering without the need for a lost-motion coupling of the kind shown at 86 and 88 in the embodiment of the steering gear shown in FIG. 1. If there should be a loss of steering pressure for any reason, the projections 76' will engage one side of the broached opening 274 or the other, depending upon the direction of the steering torque. No separate lost motion connection is required between shaft 10' and pinion 16'.

Having described preferred embodiments of my invention, what I claim and desire to secure by U.S. patent is:

I claim:

1. A fluid pressure operated power steering gear system for an engine powered vehicle, said steering gear including an engine driven fluid pump, said pump including valve means for maintaining a relatively constant fluid flow delivery regardless of engine speed;

a steering pressure movable part adapted to be connected to a vehicle steering linkage, a drive member connected to said pressure movable part, a driving shaft, a torsion member connecting said driving shaft to said drive member;

relatively displaceable steering valve elements connected respectively to said driving shaft and said drive member, said valve elements defining valve means situated in and partly defining pressure distribution and flow return passages extending between said pump and said pressure movable part for establishing steering pressure differential forces on said pressure movable part as steering torque is applied to said driving shaft;

at least two pressure reaction pistons in one of said valve elements, passage structure providing fluid communication between said pressure distribution passage and said reaction pistons whereby a reaction piston pressure force is applied to said steering valve means to resist relative displacement of said steering valve elements;

at least one steering pressure modulator valve means and a vehicle speed proportional valve means in communication with said pressure distribution passage in series flow relationship with respect to said pump and said reaction pistons for modifying the change in said reaction piston pressure force for a given change in torque applied to said driving member, the flow output from said modulator valve means being received as a flow input by said proportional valve means, means for developing a vehicle speed signal indicative of vehicle speed, said speed proportional valve means being responsive to said speed signal to reduce the rate of increase of steering pressure for a given change in said steering torque as vehicle speed increases.

2. The combination as set forth in claim 1 wherein said modulator valve means includes relatively movable regulator valve elements defining fluid pressure delivery valve lands adapted to modulate the steering pressure when steering pressure increases beyond a break-point value, thereby effecting an increased change in steering pressure for a given increase in steering torque.

3. A fluid pressure operated power steering gear mechanism comprising:

a fluid pressure source, a steering pressure movable part adapted to be connected to a steering linkage for a vehicle, a drive member connected to said pressure movable part, a driving shaft connected to said drive member;

a valve housing, a rotary steering valve means situated in said housing and partly defining pressure distribution and flow return passages extending between said pressure source and said pressure movable part for establishing steering pressure and steering pressure differential forces on said pressure movable part;

said valve means comprising an internal valve member and a surrounding sleeve valve member, said internal valve member and said sleeve valve member having registering valve lands, one of said valve members being connected to said driving shaft and the other being drivably connected to said drive member whereby relative rotary displacement of said valve members effects a change in the flow area through said valve means and a corresponding pressure differential change acting on said pressure movable part;

at least two pressure reaction pistons in said sleeve valve member, passage structure in said valve means for distributing pressure for said pressure movable part to said reaction pistons thereby establishing opposed steering torque reaction forces;

means for applying said reaction forces to said valve members whereby relative angular displacement of said valve members is resisted;

sensor means for developing a signal that is functionally related to at least one vehicle operating variable;

reaction pressure control valve means communicating with said steering valve means and said sensor means for modifying said steering pressure to establish a value for said reaction pressure that is functionally related to said one vehicle operating variable whereby a variable steering torque dependent upon said operating variable is achieved as a function of reaction pressure;

said reaction pressure control valve means comprising a solenoid valve means communicating with said pressure movable part and said pressure reaction pistons whereby said solenoid valve means is subjected to said steering pressure; and an electronic controller connected to said solenoid valve means and said sensor means whereby said solenoid valve responds to a control signal established by said controller that is related in magnitude to the magnitude of said operating variable.

4. The combination as set forth in claim 3 wherein said controller includes a memory portion that contains steering torque, steering pressure and vehicle speed data for optimum steering characteristics for various vehicle speeds, a pressure sensor means for detecting steering pressure and for delivering to said controller a steering pressure signal, and a vehicle speed sensor means for delivering to said controller a vehicle speed signal.

5. The combination as set forth in claim 1 wherein said one valve member is a sleeve piloted on said housing at one axial end of said sleeve and on said pressure movable part at the other axial end thereof;

the other of said valve members being a spool, Said internal valve member piloted within said sleeve; and an articulated driving connection between said spool and said driving shaft whereby said spool is disposed in said sleeve valve member with a floating action, the lands on said spool registering with said valve lands for said sleeve notwithstanding any misalignment between said sleeve valve member and said pressure movable part.

6. A fluid pressure operated power steering gear mechanism comprising:

a fluid pressure source, a steering pressure movable part adapted to be connected to a steering linkage for a vehicle, a drive member connected to said pressure movable part, a driving shaft, a mechanical, connection between said driving shaft and said drive member whereby steering torque may be transferred to said drive member;

a valve housing, a rotary steering valve means situated in said housing and partly defining pressure distribution and flow return passages extending between said pressure source and said pressure movable part for establishing steering pressure and steering pressure differential forces on said pressure movable part;

said valve means comprising an internal valve member and a surrounding sleeve valve member, said internal valve member and said sleeve valve member having registering valve lands, one of said valve members being connected to said driving shaft and the other being drivably connected to said drive member whereby relative rotary displacement of said valve members effects a change in the flow area through said valve means and a corresponding pressure differential change acting on said pressure movable part;

at least two pressure reaction pistons in said sleeve valve member, a passage structure in said valve means for distributing pressure for said pressure movable part to said reaction pistons thereby establishing opposed steering torque reaction forces;

means for applying said reaction forces to said valve members whereby relative angular displacement of said valve members is resisted;

modulator valve means for modifying said pressure distributed to said reaction pistons when steering pressure exceeds a breakpoint value, thereby effecting an increased change in pressure on said reaction pistons for a given increase in said steering torque;

sensor means for developing a signal that is functionally related to vehicle speed; and reaction pressure control valve means communicating with said steering valve means and said sensor means for modifying said steering pressure to establish a value for said reaction pressure that is functionally related to said vehicle signal signal variable whereby a variable steering torque dependent upon said vehicle speed is achieved as a function of reaction pressure;

said mechanical connection between said driving shaft and said drive member comprising a drive tang on said drive member received in said other valve member, said drive tang providing a reaction piston stop as said reaction pistons engage said drive tang.

7. The combination as set forth in claim 1 wherein said speed proportional valve comprises a movable valve element in a valve cavity defining a reaction piston pressure port, an exhaust port and a pressure inlet port, a solenoid actuator means for adjusting said movable valve element to increase communication between said reaction piston pressure port and said exhaust and to decrease communication between said exhaust port and said pressure inlet port when vehicle speed increases.

* * * * *